United States Patent
Matsui (10) Patent No.: US 7,484,009 B2
(45) Date of Patent: Jan. 27, 2009

(54) NETWORK CONNECTION APPARATUS, CONNECTION SYSTEM, AND NETWORK CONNECTION METHOD

(75) Inventor: Yasunori Matsui, Kanagawa (JP)

(73) Assignee: Sony Corporation, Tokyo (JP)

( * ) Notice: Subject to any disclaimer, the term of this patent is extended or adjusted under 35 U.S.C. 154(b) by 1052 days.

(21) Appl. No.: 10/488,013

(22) PCT Filed: Aug. 27, 2002

(86) PCT No.: PCT/JP02/08628

§ 371 (c)(1),
(2), (4) Date: Feb. 27, 2004

(87) PCT Pub. No.: WO03/021883

PCT Pub. Date: Mar. 13, 2003

(65) Prior Publication Data

US 2004/0243722 A1    Dec. 2, 2004

(30) Foreign Application Priority Data

Aug. 31, 2001    (JP) .............................. 2001-264470

(51) Int. Cl.
*G06F 15/16* (2006.01)

(52) U.S. Cl. ........................ 709/249; 709/250; 709/223; 709/227; 709/228

(58) Field of Classification Search .................. 709/223, 709/227–228, 250

See application file for complete search history.

(56) References Cited

U.S. PATENT DOCUMENTS 5,751,971 A * 5/1998 Dobbins et al. ............. 709/238
5,777,989 A * 7/1998 McGarvey ................... 370/254
5,802,316 A * 9/1998 Ito et al. ..................... 709/249

(Continued)

FOREIGN PATENT DOCUMENTS

CN        1315797 A * 10/2001

(Continued)

OTHER PUBLICATIONS

Chown et al.; Deliverable D.3.6.1; Jun. 10, 2005; INRIA; p. 55.*

*Primary Examiner*—Liangche Alex Wang
*Assistant Examiner*—Anthony Fabbri
(74) *Attorney, Agent, or Firm*—Frommer Lawrence & Haug LLP; William S. Frommer; Thomas F. Presson (57) ABSTRACT

A system for connecting networks that can automatically avoid address clashes to maintain communication in internetwork communication, which includes a storage unit for storing a table, a comparison unit for comparing an interface address which has been set up in a first interface with a second interface address which is set up in a second interface, a network suspension unit for, in response to address clash of the addresses compared by the comparison unit, suspending connection between the second network and an apparatus for connecting networks, a readout unit for reading out addresses including a first interface address which is different from the second interface address out of the table stored in the storage unit, and an address change unit for changing the interface address which has been set up in the first interface to the first interface address included in the addresses read out by the readout unit.

11 Claims, 6 Drawing Sheets

U.S. PATENT DOCUMENTS

| | | | | |
|---|---|---|---|---|
| 6,041,358 A * | 3/2000 | Huang et al. | ................ | 709/238 |
| 6,055,568 A * | 4/2000 | Adams | ................ | 709/221 |
| 6,065,064 A * | 5/2000 | Satoh et al. | ................ | 709/249 |
| 6,101,499 A * | 8/2000 | Ford et al. | ................ | 707/10 |
| 6,101,538 A * | 8/2000 | Brown | ................ | 709/223 |
| 6,119,171 A * | 9/2000 | Alkhatib | ................ | 709/245 |
| 6,167,444 A * | 12/2000 | Boden et al. | ................ | 709/223 |
| 6,233,616 B1 * | 5/2001 | Reid | ................ | 709/225 |
| 6,243,825 B1 * | 6/2001 | Gamache et al. | ................ | 714/4 |
| 6,249,820 B1 * | 6/2001 | Dobbins et al. | ................ | 709/238 |
| 6,266,335 B1 * | 7/2001 | Bhaskaran | ................ | 370/399 |
| 6,715,029 B1 * | 3/2004 | Trainin et al. | ................ | 711/108 |
| 7,395,323 B2 * | 7/2008 | Larson et al. | ................ | 709/222 |
| 2001/0011303 A1 * | 8/2001 | Chang et al. | ................ | 709/227 |
| 2001/0012282 A1 * | 8/2001 | Yegoshin | ................ | 370/338 |
| 2001/0017862 A1 * | 8/2001 | Tokuyo et al. | ................ | 370/401 |
| 2003/0105830 A1 * | 6/2003 | Pham et al. | ................ | 709/216 |
| 2004/0044791 A1 * | 3/2004 | Pouzzner | ................ | 709/245 |
| 2005/0076142 A1 * | 4/2005 | Chin | ................ | 709/245 |
| 2008/0077686 A1 * | 3/2008 | Subhraveti | ................ | 709/224 |
| 2008/0172497 A1 * | 7/2008 | Mohan et al. | ................ | 709/249 |

FOREIGN PATENT DOCUMENTS

| | | |
|---|---|---|
| JP | 5-14354 | 1/1993 |
| JP | 6-268650 | 9/1994 |
| JP | 9-233112 | 9/1997 |
| JP | 11-8648 | 1/1999 |
| JP | 11-127217 | 5/1999 |
| JP | 2000-156710 | 6/2000 |

* cited by examiner

| addridx | ADDRESS OF iface A1 | NETWORK A ALLOCATION ADDRESS RANGE |
|---|---|---|
| 0 | 192.168.10.1 | 192.168.10.16–192.168.10.32 |
| 1 | 172.20.10.1 | 172.20.10.16–172.20.10.32 |

FIG.3

| addridx | SELF ADDRESS | GATEWAY ADDRESS |
|---|---|---|
| 0 | 192.168.10.24 | 192.168.10.1 |
| 1 | 172.20.10.24 | 172.20.10.1 |

NETWORK CONNECTION APPARATUS, CONNECTION SYSTEM, AND NETWORK CONNECTION METHOD

TECHNICAL FIELD

The present invention relates to network communication, in particular, to an apparatus and system for connecting networks, and a method for connecting networks, which can avoid address clashes in inter-network communication.

BACKGROUND ART

In network communication, a comparatively small-sized network sometimes makes a connection to a large-sized network dynamically using an apparatus for connecting networks such as a gateway so as to send/receive data to/from the large-sized network.

For example, the dynamic connection to a network corresponds to a case of making a connection to a network provided by an ISP (Internet Service Provider) through a dial-up router from a home-LAN (Local Area Network). The user has an access to an ISP from a PC (Personal Computer) configuring a home-LAN through dial-up accessing. Then, the ISP allocates an IP (Internet Protocol) address to the PC. Thus, the home-LAN and a network provided by the ISP is connected through a dial-up router working as a gateway. The IP address allocated to the PC by the ISP is changed every time dial-up accessing is made.

In network communication, IP addresses of respective hosts existing in a network, which specify communication partners, have to be different from each other, and global IP addresses being unique IP addresses are given to respective hosts on a network under management of the NIC (Network Information Center) and JPNIC (JP-Network Information Center).

A closed network such as a home-LAN or a firm-LAN is not subject to the rule, and independent IP addresses can be set up so long as overlapped addresses are not used in the closed network. In such a LAN, private IP addresses, which are not permitted on the Internet, can be used. In case a private IP address is sent onto the Internet, its packet is deleted since there is made a stipulation that such a private IP address must not be routed.

In a firm, as described above, a LAN may be configured using private IP addresses, and, for example, a main office and its branch offices may independently configure a LAN respectively.

When performing network communication by connecting LANs that are independently configured using private IP addresses, there occurs no problem in case respective used address spaces are different from each other. On the other hand, in case respective used address spaces are overlapped, hosts of the same address undesirably exist in respective networks, which disallows communication through a gateway.

In case there exist hosts of the same address, a private IP address of a host belonging to one of networks has to be set up manually, which requires troublesome work.

It is anticipated that private IP addresses will further be used by an ISP (Internet Service Provider) so as to avoid risks due to full-time connection, or owing to depletion of finite IP addresses. Thus, as described above, when making a connection between different networks, there often occur address overlaps, which undesirably leads to delayed communication between networks.

DISCLOSURE OF THE INVENTION

Accordingly, the present invention has an object to overcome the above-mentioned drawbacks of the prior art by providing a new apparatus and system for connecting networks, and a new method for connecting networks.

Furthermore, the present invention has another object to provide an apparatus and system for connecting networks, and a method for connecting networks, which can automatically avoid address clashes in communication between networks so as to maintain inter-network communication.

The above object can be attained by providing an apparatus for connecting networks which connects a first network, to which a plurality of terminal units belong, and a second network through a first interface and a second interface, including:

storage means for storing a table having arranged therein a plurality of addresses consisting of a first interface address and a plurality of terminal unit addresses which specify presences of the first interface and of the plural terminal units in the first network, and can be set up in the first interface and in the plural terminal units, respectively;

comparison means for, in response to connection between the second network and the apparatus for connecting networks after a second interface address which specifies presence of the second interface in the second network is set up in the second interface, comparing an interface address which has been set up in the first interface with the second interface address which is set up in the second interface;

network suspension means for, in response to address clash of the interface address which has been set up in the first interface and the second interface address which is set up in the second interface after comparison by the comparison means, suspending connection between the second network and the apparatus for connecting networks;

readout means for, in response to suspension of the second network from the apparatus for connecting networks by the network suspension means, reading out addresses including a first interface address which is different from the second interface address out of the table stored in the storage means;

address change means for changing the interface address which has been set up in the first interface to the first interface address included in the addresses read out by the readout means;

first transmission means for sending an address change message that the interface address which has been set up in the first interface is changed to the first interface address by the address change means to the plural terminal units;

reception means for, in response to change of terminal unit addresses of the plural terminal units by the terminal units after receiving the address change message sent from the first transmission means, receiving address change confirmation messages that the terminal unit addresses of the plural terminal units are changed which are sent from the respective terminal units; and second transmission means for, in response to reception of the address change confirmation messages sent from the plural terminal units by the reception means, sending an address change end message that the entire terminal unit addresses of the plural terminal units are changed to the plural terminal units.

Also the above object can be attained by providing a system for connecting networks which has an apparatus for connecting networks which connects a first network and a second network through a first interface and a second interface, and a plurality of terminal units which belong to the first network, the apparatus for connecting networks including:

first storage means for storing a first table having arranged therein a plurality of addresses consisting of a first interface address and a plurality of terminal unit addresses which specify presences of the first interface and of the plural terminal units in the first network, and can be set up in the first interface and in the plural terminal units, respectively;

address comparison means for, in response to connection between the second network and the apparatus for connecting networks after a second interface address which specifies presence of the second interface in the second network is set up in the second interface, comparing an interface address which has been set up in the first interface with the second interface address which is set up in the second interface;

network suspension means for, in response to address clash of the interface address which has been set up in the first interface and the second interface address which is set up in the second interface after comparison by the address comparison means, suspending connection between the second network and the apparatus for connecting networks;

readout means for, in response to suspension of the second network from the apparatus for connecting networks by the network suspension means, reading out addresses including a first interface address which is different from the second interface address which is set up in the second interface out of the first table stored in the first storage means;

first address change means for changing the interface address which has been set up in the first interface to the first interface address included in the addresses read out by the readout means;

first transmission means for sending an address change message that the interface address which has been set up in the first interface is changed to the first interface address by the address change means to the plural terminal units;

first reception means for receiving address change confirmation messages that the terminal unit addresses of the plural terminal units are changed which are sent from the respective terminal units; and second transmission means for, in response to reception of the address change confirmation messages sent from the plural terminal units by the first reception means, sending an address change end message that the entire terminal unit addresses of the plural terminal units are changed to the plural terminal units, and each of the terminal units including:

second reception means for receiving the address change message sent from the first transmission means of the apparatus for connecting networks;

second address change means for, in response to reception of the address change message by the second reception means, changing an address of the terminal unit to the terminal unit address;

third transmission means for sending the address change confirmation message that the terminal unit address is changed by the second address change means to the apparatus for connecting networks; and third reception means for receiving the address change end message sent from the second transmission means of the apparatus for connecting networks.

Also the above object can be attained by providing a method for connecting networks for a system for connecting networks which has an apparatus for connecting networks which connects a first network and a second network through a first interface and a second interface, and a plurality of terminal units which belong to the first network, including the steps, by the apparatus for connecting networks, of:

storing a first table having arranged therein a plurality of addresses consisting of a first interface address and a plurality of terminal unit addresses which specify presences of the first interface and of the plural terminal units in the first network, and can be set up in the first interface and in the plural terminal units, respectively, in a first storage means;

in response to connection between the second network and the apparatus for connecting networks after a second interface address which specifies presence of the second interface in the second network is set up in the second interface, comparing an interface address which has been set up in the first interface with the second interface address which is set up in the second interface;

in response to address clash of the interface address which has been set up in the first interface and the second interface address which is set up in the second interface after comparison in the comparison step, suspending connection between the second network and the apparatus for connecting networks;

in response to suspension of the second network from the apparatus for connecting networks, reading out addresses including a first interface address which is different from the second interface address which is set up in the second interface out of the first table stored in the first storage means;

changing the interface address which has been set up in the first interface to the first interface address included in the read out addresses; and sending an address change message that the interface address which has been set up in the first interface is changed to the first interface address to the plural terminal units, and including the steps, by each of the terminal units, of:

receiving the address change message sent from the apparatus for connecting networks;

in response to reception of the address change message, changing an address of the terminal unit to the terminal unit address; and sending an address change confirmation message that the terminal unit address is changed to the apparatus for connecting networks, and including the steps, by the apparatus for connecting networks, of:

receiving the address change confirmation messages which are sent from the respective terminal units; and in response to reception of the address change confirmation messages sent from the plural terminal units, sending an address change end message that the entire terminal unit addresses of the plural terminal units are changed to the plural terminal units, and including the step, by each of the terminal units, of:

receiving the address change end message sent from the apparatus for connecting networks.

These objects and other objects, features and advantages of the present invention will become more apparent from the following detailed description of the preferred embodiments of the present invention.

BEST MODE FOR CARRYING OUT THE INVENTION

The apparatus and system for connecting networks, and the method for connecting networks according to the present invention will further be described below concerning the best modes for carrying out the present invention with reference to the accompanying drawings.

Figure 1:
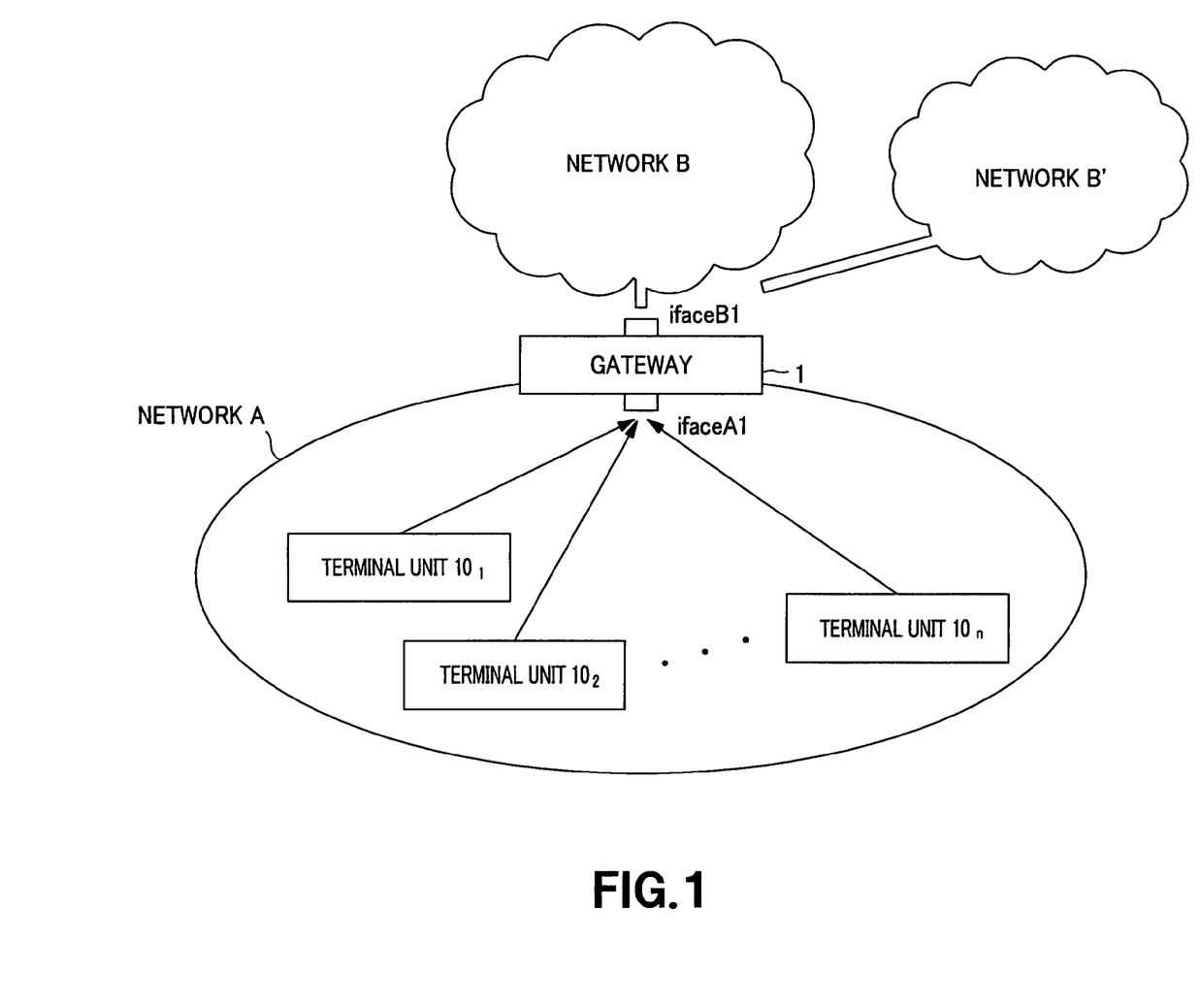
FIG. 1 shows a schematic view of a system for connecting networks.

FIG. 1 shows a schematic view of a system for connecting networks to which the present invention is adapted.

In the system for connecting networks to which the present invention is adapted, a network A which has a plurality of terminal units 10$n$ ("n" being natural number) connected thereon by the Ethernet (registered trademark), etc. to configure a LAN (Local Area Network) and a network B which is an external network of the network A is connected by a gateway 1 working as an apparatus for connecting networks, as shown in FIG. 1.

The network B is provided with a DHCP (Dynamic Host Configuration Protocol) server, not shown. The DHCP server is a server that can automatically allocate IP addresses to respective hosts on a network. Being provided with the DHCP server, it becomes unnecessary for the manager to allocate IP addresses to PCs that are to be newly added onto a network, and the host side does not have to set up an obtained IP address manually.

The DHCP server on the network B broadcasts an IP address to an interface (iface) B1, to be described later, of the gateway 1 in response to a requirement from the network A. In this case, the interface B1 becomes a client for the DHCP server.

Both the network A and the network B are closed network spaces, and private IP addresses are set up for the terminal units 10$n$ of the network A and for hosts constituting the network B, respectively. That is, an address of the interface (iface) B1 is given dynamically by the network B to which the interface B1 is connected.

The network connected to the gateway 1 is not restricted to the specific network B alone, and may be a network B' different from the network B. That is, the network B, which is connected to the interface (iface) B1, can be changed to the network B'.

Figure 2:
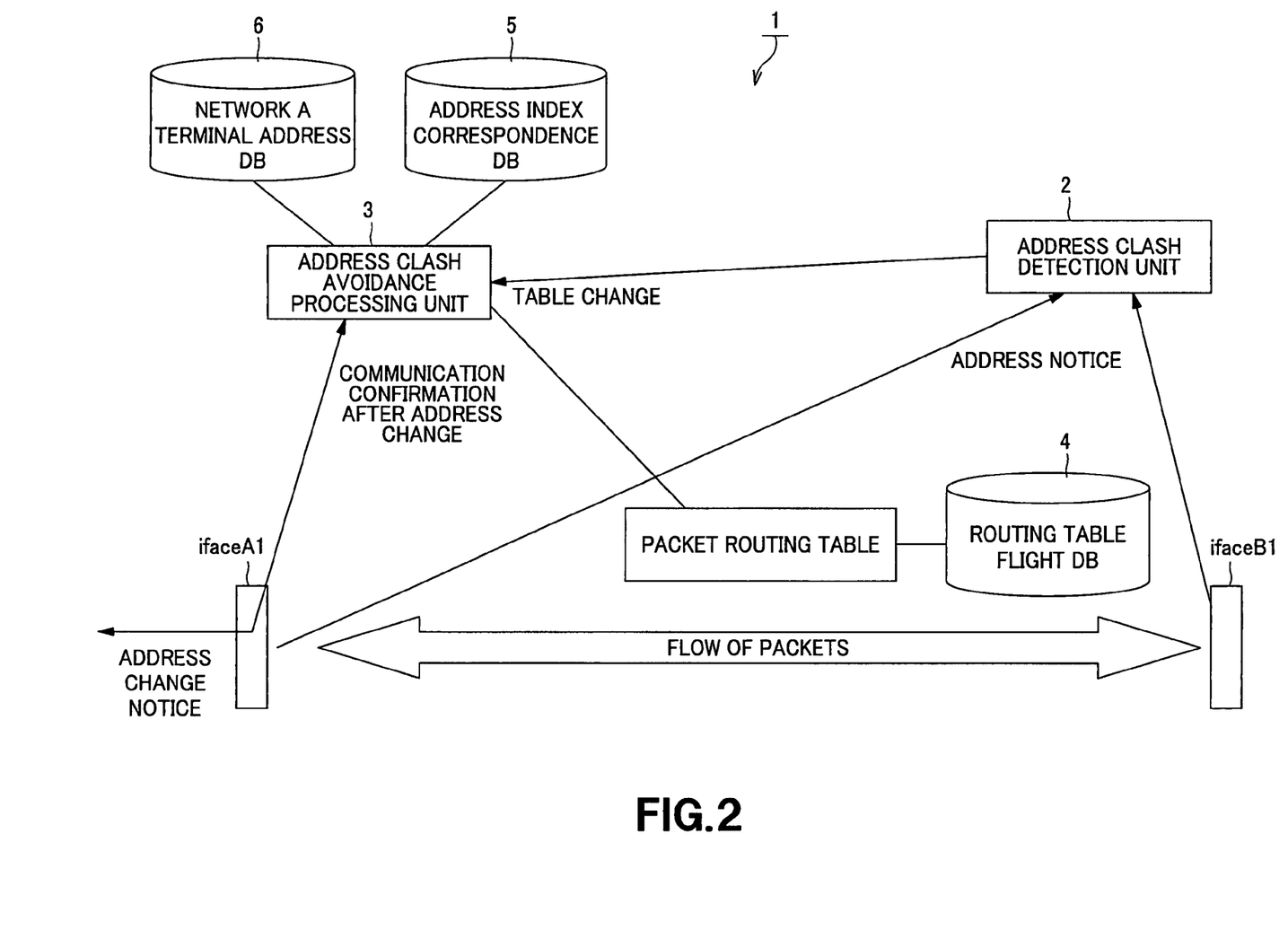
FIG. 2 shows a schematic view of a gateway that connects networks in the system for connecting networks.

FIG. 2 shows a schematic view of the gateway 1.

The gateway 1 includes an interface (iface) A1 for making a connection to the network A, the interface (iface) B1 for making a connection to the network B, an address clash detection unit 2, an address clash avoidance processing unit 3, a routing table flight data base 4, an address index correspondence data base 5, and a network A terminal address data base 6.

The interface A1 is an interface for making a connection to the network A, in which a private IP address is set up.

The interface B1 is an interface for making a connection to the network B, in which a private IP address is set up by the DHCP server, not shown.

For example, when making a connection to the network B, the gateway 1 broadcasts a packet to confirm whether or not the DHCP server is provided on the network B. Accordingly, the DHCP server on the network B determines a predetermined private IP, and sends thus determined private IP to the interface B1. Thus, a private IP address is set up in the interface B1.

When a private IP address is set up in the interface B1, the address clash detection unit 2 compares thus set up private IP address with a private IP address of the interface A1 to judge whether or not the two addresses clash, that is, whether or not network addresses of those private IP addresses coincide with each other. When address clash is detected, this information is sent to the address clash avoidance processing unit 3. In case subnets are defined, subnet addresses are compared to detect address clash.

When receiving information that address clash of the private IP addresses of the interface A1 and interface B1 is detected at the address clash detection unit 2, the address clash avoidance processing unit 3 controls respective units overall so as to avoid address clash.

For example, in response to detection of address clash of the private IP addresses, the address clash avoidance processing unit 3 suspends communication of the interface B1, and stores a routing table being held concerning the interface A1 and interface B1 in the routing table flight data base 4.

Furthermore, in response to detection of address clash of the private IP addresses, the address clash avoidance processing unit 3 changes an address index, and obtains new private IP addresses for the interface A1 and for the terminal units 10$n$ from the address index correspondence data base 5, to be described later, and sets up the private IP addresses, respectively.

In response to detection of address clash of the private IP addresses of the interface A1 and interface B1, the routing table flight data base 4 stores the routing table concerning the interface A1 and interface B1 which is eliminated under the control of the address clash avoidance processing unit 3. The routing table that is eliminated to be stored in the routing table flight data base 4 is read out when new private IP addresses are set up for the interface A1 and for the terminal units 10$n$, and is updated using the new private IP addresses.

The address index correspondence data base 5 is a data base having a table in which address indexes (addridx) correspond to addresses of the interface A1 and of the terminal units 10$n$.

Figure 3:
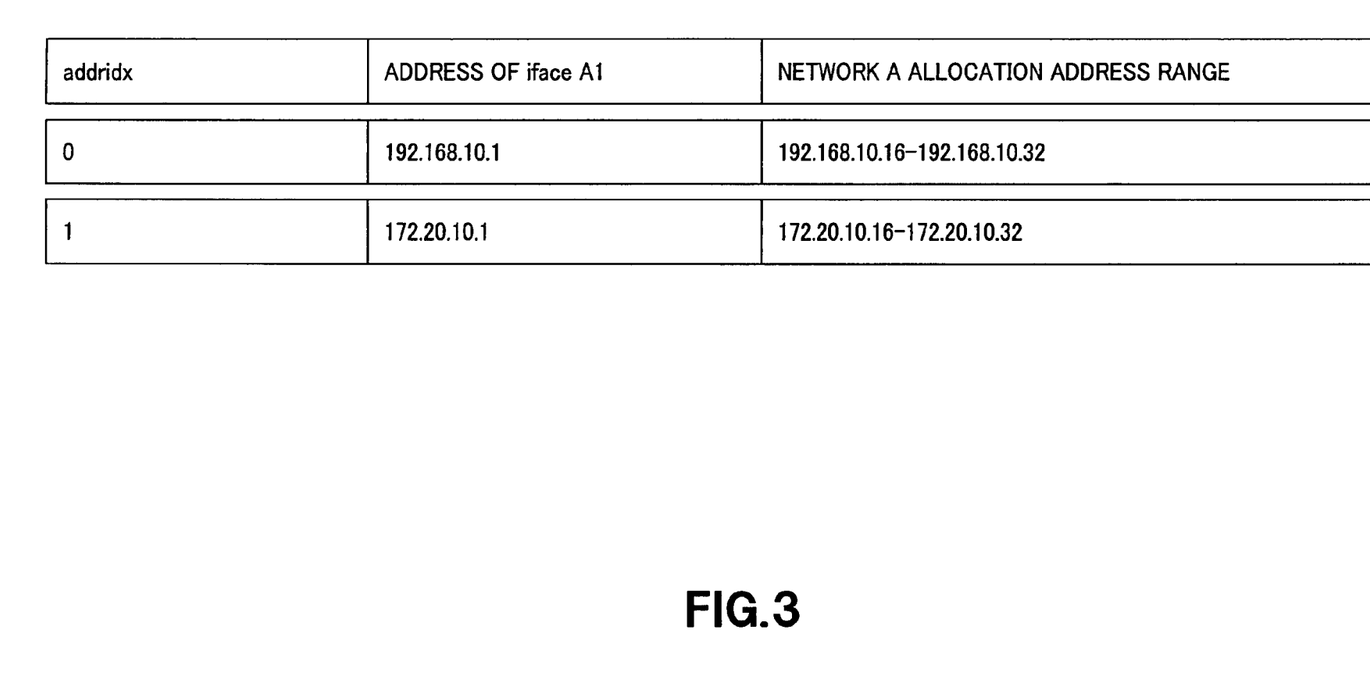
FIG. 3 shows a table of the gateway in the system for connecting networks.

For example, the address index correspondence data base 5 has stored therein an interface address correspondence table, as shown in FIG. 3. In case an address index is "0", "192.168.10.1" is set up as an IP address for the interface A1, and IP addresses in the range of "192.168.10.16" to "192.168.10.32" can be set up as IP addresses for the terminal units 10$n$ belonging to the network A. Similarly, in case an address index is "1", "172.20.10.1" is set up as an IP address for the interface A1, and IP addresses in the range of "172.20.10.16" to "172.20.10.32" can be set up as IP addresses for the terminal units 10$n$ belonging to the network A.

Thus, IP addresses of the interface A1 and of the terminal units 10$n$ belonging to the network A can be changed depending on the address index.

The network A terminal address data base 6 has stored therein private IP addresses of the terminal units 10$n$ connected to the network A.

The gateway 1 may be provided with a DHCP server, not shown. Accordingly, the gateway 1 can give IP addresses dynamically in response to requirements of the terminal units 10$n$.

For example, each of the terminal units 10$n$ is a PC (Personal Computer) having function of network connection. The terminal units 10$n$ are connected to the interface A1 of the gateway 1, and are connected to the network B through the interface B1 of the gateway 1.

Figure 4:
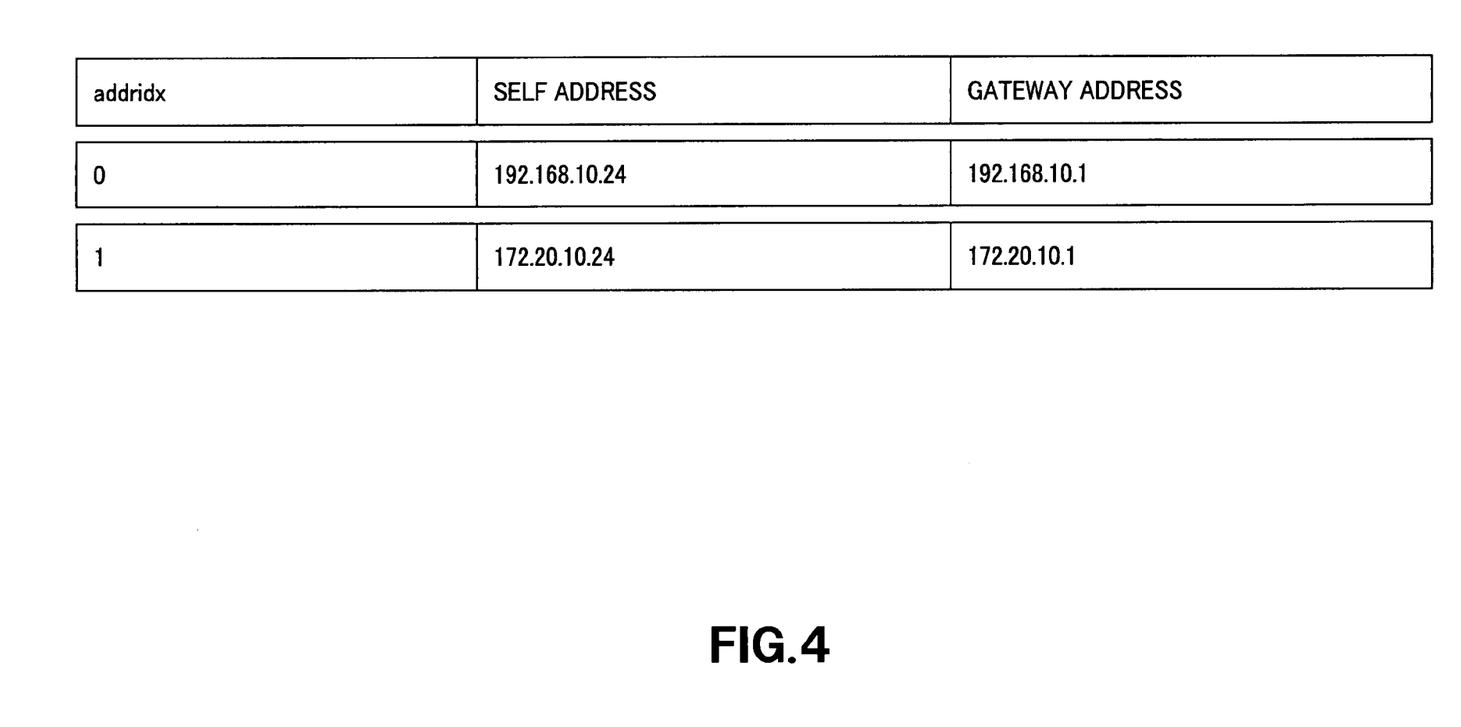
FIG. 4 shows a table of a terminal unit in the system for connecting networks.

Each of the terminal units 10n has a storage unit, not shown, having stored therein a terminal unit address correspondence table in which IP addresses corresponding to address indexes are written, as shown in FIG. 4.

The terminal unit address correspondence table is a table corresponding to address indexes which are changed by the address clash avoidance processing unit 3 in response to detection of address clash of the private IP addresses of the interface A1 and interface B1, and private IP address of the terminal unit 10n is changed when the address index is changed.

For example, in case an address index is "0", "192.168.10.24" is set up as a private IP address for the terminal unit 10n, and in case an address index is "1", "172.20.10.24" is set up as a private IP address for the terminal unit 10n, as shown in FIG. 4.

The terminal unit 10n receives information to change address index sent from the gateway 1, and changes its private IP address by referring to the table shown in FIG. 4.

The terminal unit address correspondence table shown in FIG. 4 is unnecessary in case the gateway 1 is provided with the DHCP server and the terminal units 10n can automatically obtain IP addresses.

Figure 5:
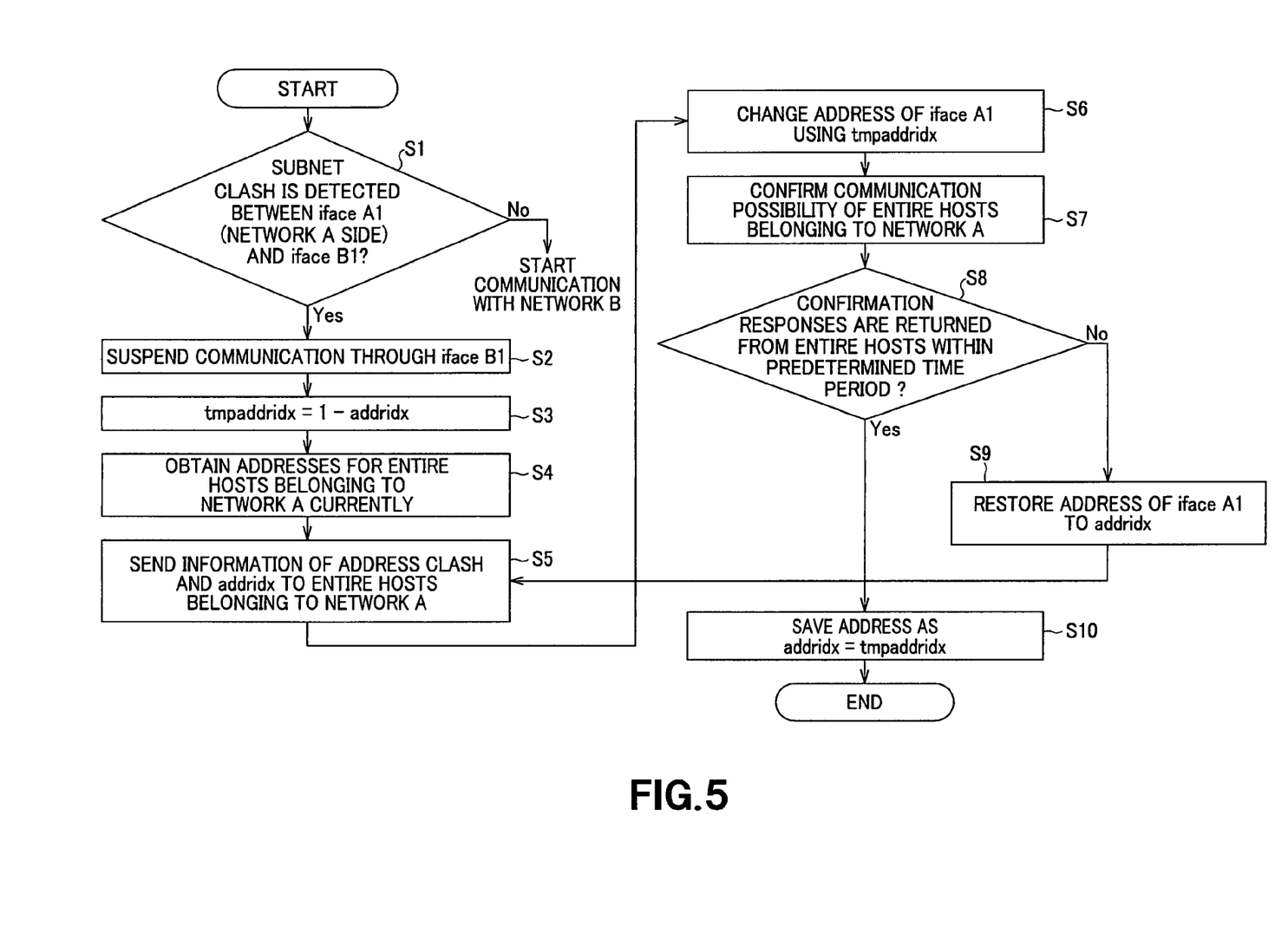
FIG. 5 shows a flow chart for explaining the operation of the gateway when addresses clash in the system for connecting networks.

FIG. 5 shows a flow chart for explaining the operation of the gateway 1.

When there is raised a requirement to have an access to the network B from a predetermined terminal unit 10n belonging to the network A, the DHCP server of the network B selects a predetermined private IP address, and sets up thus selected private IP address in the interface B1. Thus, the network A and the network B are connected through the interface B1.

In step S1, after being connected to the network B, the address clash detection unit 2 compares the private IP address set up in the interface B1 with a private IP address of the interface A1 to judge whether or not those private IP addresses coincide with each other. In case those private IP addresses clash, the processing proceeds to step S2, and in case not, communication with the network B is initiated.

In step S2, the address clash avoidance processing unit 3 suspends communication with the network B through the interface B1, and deletes the entire routing table which is a table relating IP addresses of hosts on the network B with routing directions. In general, a router or a gateway having routing function determines routing of packets using the routing table.

In step S3, the address clash avoidance processing unit 3 changes the current address index (addridx) to a new unused address index.

For example, when a new address index is defined as "tmpaddridx" and a previous address index is defined as "addridx", the current address index can be changed to a new address index by performing calculation using the following equation (1).

$$tmpaddridx = 1 - addridx \quad (1)$$

When the current address index is "0", a new address index becomes "1" from the equation (1).

In step S4, the address clash avoidance processing unit 3 obtains addresses for the entire terminal units 10n belonging to the network A. In obtaining addresses, there are a manner in which the address clash avoidance processing unit 3 has an access to the network A terminal address data base 6 being a data base which has stored therein address information of the entire terminal units 10n belonging to the network A, and a manner in which the address clash avoidance processing unit 3 broadcasts packets for obtaining addresses to the terminal units 10n belonging to the network A and receives IP addresses sent accordingly from the terminal units 10n.

These manners of obtaining addresses depend on the configuration of the gateway 1, and whichever method can be employed in step S4.

In step S5, the address clash avoidance processing unit 3 sends information that addresses of the interface A1 and interface B1 clash to the entire terminal units 10n belonging to the network A through the interface A1, and broadcasts an address clash notice message including a new address index.

In step S6, the address clash avoidance processing unit 3 has an access to the address index correspondence data base 5 to refer to the interface address correspondence table shown in FIG. 3, and reads out a private IP address corresponding to a new address index calculated in step S3 using the equation (1), and then changes the private IP address of the interface A1.

In step S7, the address clash avoidance processing unit 3 broadcasts predetermined packets to the entire terminal units 10n belonging to the network A, and confirms whether or not communication is possible depending on responses for the packets.

In step S8, the address clash avoidance processing unit 3 judges whether or not confirmation responses for the packets broadcasted in step S7 are returned from the entire terminal units 10n within a predetermined time period. In case confirmation responses are returned from the entire terminal units 10n within a predetermined time period, the processing proceeds to step S10, and in case not, the processing proceeds to step S9.

In step S9, the address clash avoidance processing unit 3 restores the IP address of the interface A1 to the IP address corresponding to the address index which has not been changed yet in step S3. When the processing of step S9 comes to an end, the processing returns to step S5, and the address clash notice message is broadcasted again to the terminal units 10n.

In step S10, the address clash avoidance processing unit 3 refers to the interface address correspondence table shown in FIG. 3 stored in the address index correspondence data base 5, and saves IP addresses of the respective terminal units 10n corresponding to the new address index to the network A terminal address data base 6 as the current IP addresses. Then, the address clash avoidance processing unit 3 sends an address change end message that the processing of changing private IP addresses of the interface A1 and of the terminal units 10n is completed to the entire terminal units 10n.

Thus, in response to address clash of the private IP addresses of the interface A1 and interface B1, the gateway 1 changes the IP address of the interface A1 using the interface address correspondence table shown in FIG. 3, and broadcasts this information to the entire terminal units 10n belonging to the network A.

Figure 6:
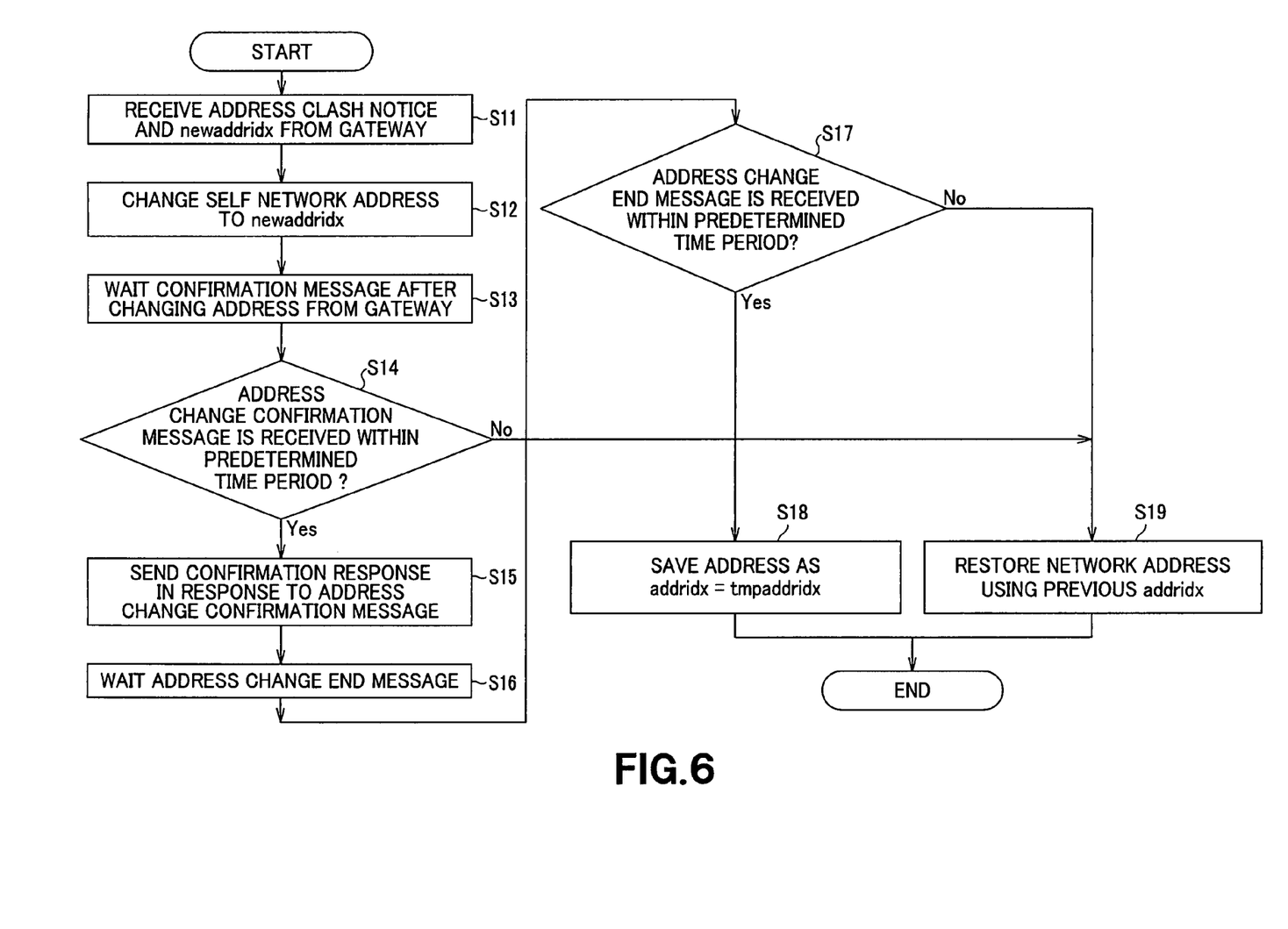
FIG. 6 shows a flow chart for explaining the operation of the terminal unit when addresses clash in the system for connecting networks.

FIG. 6 shows a flow chart for explaining the operation of the terminal unit 10n corresponding to the processing of the gateway 1 explained using FIG. 5.

In step S11, a control unit, not shown, of the terminal unit 10n receives the address clash notice message including a new address index (newaddridx) calculated in step S3 of the flow chart shown in FIG. 5, which is sent from the gateway 1.

In step S12, the unshown control unit changes the private IP address of the terminal unit 10n using a new address index included in the address clash notice message received in step S11 and the terminal unit address correspondence table shown in FIG. 4 stored in a data base, not shown, of the terminal unit 10n.

In case the gateway 1 is provided with the DHCP server and an IP address can be obtained from the gateway 1, after receiving the address clash notice message, the private IP address set up in the terminal unit 10n is deleted, and a new IP address is obtained by having an access to the DHCP server of the gateway 1.

In step S13, the terminal unit 10n comes into the state of waiting an address change confirmation message broadcasted by the gateway 1 in step S7 of the flow chart shown in FIG. 5.

In step S14, the unshown control unit judges whether or not the address change confirmation message sent from the gateway 1 is received within a predetermined time period. In case the address change confirmation message is received within a predetermined time period, the processing proceeds to step S15, and in case not, the processing proceeds to step S19.

In step S15, the unshown control unit sends a response message to the gateway 1 in response to reception of the address change confirmation message.

In step S16, the unshown control unit comes into the state of waiting the address change end message to be sent from the gateway 1.

In step S17, the unshown control unit judges whether or not the address change end message sent from the gateway 1 is received within a predetermined time period. In case the address change end message is received within a predetermined time period, the processing proceeds to step S18, and in case not, the processing proceeds to step S19.

In step S18, in response to reception of the address change end message, the unshown control unit judges that the address change processing of the entire terminal units 10n belonging to the network A is successfully performed, and changes the address index (addridx) stored in the storage unit, not shown, to a new address index (newaddridx) to save thus changed address index.

In step S19, in response to failure of reception of the address change end message, the unshown control unit judges that the address change processing of another terminal unit 10n belonging to the network A is unsuccessfully performed, and restores the private IP address of the terminal unit 10n to the IP address before the change processing.

Thus, in response to reception of the address clash notice message sent from the gateway 1, the terminal unit 10n can change its private IP address along with the change processing of the private IP address of the interface A1.

Thus, in response to address clash of the private IP addresses of the interface A1 and interface B1, a private IP address of the interface A1 of the gateway 1 is changed based on the interface address correspondence table stored in the address index correspondence data base 5, and accordingly a private IP address of the terminal unit 10n is changed, which can automatically avoid address clashes.

In the above-described embodiments, the gateway 1 connects two networks or the network A and network B. On the other hand, the present invention is not restricted to this, and the gateway 1 may connects a plurality of networks more than two.

INDUSTRIAL APPLICABILITY

As in the above, according to the apparatus for connecting networks of the present invention, when addresses of network connection interfaces of a first network, to which a plurality of terminal units belong, and a second network which is connected to the first network through the apparatus for connecting networks clash, a comparison unit immediately detects the address clash, and a network suspension unit suspends connection between the connected networks, which can avoid address clash.

Next, the apparatus for connecting networks reads out a first interface address which does not clash out of a table stored in a storage unit, and changes an interface address of a first interface of the apparatus for connecting networks by a first address change unit to connect networks, and accordingly changes terminal unit addresses of the plural terminal units belonging to the first network by a second address change unit. Thus, when address clash occurs in communication between networks, new addresses are automatically set up, maintaining communication.

As in the above, according to the system for connecting networks of the present invention, when addresses of network connection interfaces of a first network, to which a plurality of terminal units belong, and a second network which is connected to the first network through the apparatus for connecting networks clash, a comparison unit immediately detects the address clash, and a network suspension unit suspends connection between the connected networks, which can avoid address clash.

Next, the system for connecting networks reads out a first interface address which does not clash out of a first table stored in a first storage unit, and changes an interface address of a first interface of the apparatus for connecting networks by a first address change unit to connect networks, and accordingly changes terminal unit addresses of the plural terminal units belonging to the first network by a second address change unit. Thus, when address clash occurs in communication between networks, new addresses are automatically set up, maintaining communication.

As in the above, according to the method for connecting networks of the present invention, when addresses of network connection interfaces of a first network, to which a plurality of terminal units belong, and a second network which is connected to the first network through the apparatus for connecting networks clash, the address clash is immediately detected, and connection between the connected networks is suspended, which can avoid address clash.

Next, a first interface address which does not clash is read out from a first table stored in a first storage unit, and an interface address of a first interface of the apparatus for connecting networks is changed to the first interface address to connect networks, and accordingly terminal unit addresses of the plural terminal units are changed. Thus, when address clash occurs in communication between networks, new addresses are automatically set up, maintaining communication.

The invention claimed is:

1. An apparatus for connecting networks which connects a first network, which includes a plurality of terminal units, and a second network through a first interface and a second interface, comprising:
    storage means for storing a table having arranged therein a plurality of addresses consisting of a first interface address and a plurality of terminal unit addresses which specify presences of the first interface and of the plural terminal units in the first network, and can be set up in the first interface and in the plural terminal units, respectively;
    comparison means for, in response to connection between the second network and the apparatus for connecting networks after a second interface address which specifies presence of the second interface in the second network is set up in the second interface, comparing an interface address which has been set up in the first interface with the second interface address which is set up in the second interface;

network suspension means for, in response to address clash of the interface address which has been set up in the first interface and the second interface address which is set up in the second interface after comparison by the comparison means, suspending connection between the second network and the apparatus for connecting networks;

readout means for, in response to suspension of the second network from the apparatus for connecting networks by the network suspension means, reading out addresses including a first interface address which is different from the second interface address out of the table stored in the storage means;

address change means for changing the interface address which has been set up in the first interface to the first interface address included in the addresses read out by the readout means;

first transmission means for sending an address change message that the interface address which has been set up in the first interface is changed to the first interface address by the address change means to the plural terminal units;

reception means for, in response to change of terminal unit addresses of the plural terminal units by the terminal units after receiving the address change message sent from the first transmission means, receiving address change confirmation messages that the terminal unit addresses of the plural terminal units are changed which are sent from the respective terminal units;

second transmission means for, in response to reception of the address change confirmation messages sent from the plural terminal units by the reception means, sending an address change end message that the entire terminal unit addresses of the plural terminal units are changed to the plural terminal units;

second reception means for, in response to transmission of the address change message by the first transmission means, receiving terminal unit address transmission requirements which are sent from the terminal units; and third transmission means for, in response to the terminal unit address transmission requirements received by the second reception means, sending the terminal unit addresses included in the addresses read out by the readout means out of the table stored in the storage means to the respective plural terminal units included in the first network.

2. The apparatus for connecting networks as set forth in claim 1, wherein the plural addresses arranged in the table stored in the storage means have given thereto indexes to identify the respective addresses.

3. The apparatus for connecting networks as set forth in claim 1, wherein the first transmission means adds indexes of the addresses, which include the first interface address changed by the address change means, to the address change message, and sends the address change message to the plural terminal units.

4. The apparatus for connecting networks as set forth in claim 1, wherein the first interface address, the terminal unit addresses, and the second interface address are private IP (Internet Protocol) addresses which can be set up arbitrarily by a user in a closed network.

5. A system for connecting networks which has an apparatus for connecting networks which connects a first network and a second network through a first interface and a second interface, and a plurality of terminal units included in the first network, the apparatus for connecting networks comprising:

first storage means for storing a first table having arranged therein a plurality of addresses consisting of a first interface address and a plurality of terminal unit addresses which specify presences of the first interface and of the plural terminal units in the first network, and can be set up in the first interface and in the plural terminal units, respectively;

address comparison means for, in response to connection between the second network and the apparatus for connecting networks after a second interface address which specifies presence of the second interface in the second network is set up in the second interface, comparing an interface address which has been set up in the first interface with the second interface address which is set up in the second interface;

network suspension means for, in response to address clash of the interface address which has been set up in the first interface and the second interface address which is set up in the second interface after comparison by the address comparison means, suspending connection between the second network and the apparatus for connecting networks;

readout means for, in response to suspension of the second network from the apparatus for connecting networks by the network suspension means, reading out addresses including a first interface address which is different from the second interface address which is set up in the second interface out of the first table stored in the first storage means;

first address change means for changing the interface address which has been set up in the first interface to the first interface address included in the addresses read out by the readout means;

first transmission means for sending an address change message that the interface address which has been set up in the first interface is changed to the first interface address by the address change means to the plural terminal units;

first reception means for receiving address change confirmation messages that the terminal unit addresses of the plural terminal units are changed which are sent from the respective terminal units; and second transmission means for, in response to reception of the address change confirmation messages sent from the plural terminal units by the first reception means, sending an address change end message that the entire terminal unit addresses of the plural terminal units are changed to the plural terminal units, and each of the terminal units comprising:

second reception means for receiving the address change message sent from the first transmission means of the apparatus for connecting networks;

second address change means for, in response to reception of the address change message by the second reception means, changing an address of the terminal unit to the terminal unit address;

third transmission means for sending the address change confirmation message that the terminal unit address is changed by the second address change means to the apparatus for connecting networks;

third reception means for receiving the address change end message sent from the second transmission means of the apparatus for connecting networks;

second storage means for storing a second table in which terminal unit addresses which can be set up in the terminal unit correspond to the indexes, wherein the first transmission means of the apparatus for connecting networks adds indexes of the addresses, which include the first interface address changed by the first address change means, to the address change message, and sends the address change message to the plural terminal units, and wherein, in response to reception of the address change message, to which the indexes are added, by the second reception means, the second address change means of the terminal unit refers to the second table stored in the second storage means to retrieve terminal unit addresses which correspond to the indexes added to the address change message, and changes an address of the terminal unit to thus retrieved terminal unit address.

6. The system for connecting networks as set forth in claim 5, the terminal unit further comprising:

fourth transmission means for, in response to reception of the address change message by the second reception means, sending a terminal unit address transmission requirement, and the apparatus for connecting networks further comprising:

fourth reception means for receiving the terminal unit address transmission requirements which are sent from the fourth reception means of the terminal units; and fifth transmission means for, in response to the terminal unit address transmission requirements received by the fourth reception means, sending the terminal unit addresses included in the addresses read out by the readout means out of the first table stored in the first storage means to the respective plural terminal units included in the first network, wherein the second address change means of the terminal unit changes an address of the terminal unit to the terminal unit address sent by the fifth transmission means.

7. The system for connecting networks as set forth in claim 5, wherein the plural addresses arranged in the first table stored in the first storage means of the apparatus for connecting networks have given thereto indexes to identify the respective addresses.

8. The system for connecting networks as set forth in claim 5, wherein the first interface address, the terminal unit addresses, and the second interface address are private IP (Internet Protocol) addresses which can be set up arbitrarily by a user in a closed network.

9. A method for connecting networks which connects a first network, which includes a plurality of terminal units, and a second network through a first interface and a second interface, comprising the steps, by the apparatus for connecting networks, of:

storing a first table having arranged therein a plurality of addresses consisting of a first interface address and a plurality of terminal unit addresses which specify presences of the first interface and of the plural terminal units in the first network, and can be set up in the first interface and in the plural terminal units, respectively, in a first storage means;

in response to connection between the second network and the apparatus for connecting networks after a second interface address which specifies presence of the second interface in the second network is set up in the second interface, comparing an interface address which has been set up in the first interface with the second interface address which is set up in the second interface;

in response to address clash of the interface address which has been set up in the first interface and the second interface address which is set up in the second interface after comparison in the comparison step, suspending connection between the second network and the apparatus for connecting networks;

in response to suspension of the second network from the apparatus for connecting networks, reading out addresses including a first interface address which is different from the second interface address which is set up in the second interface out of the first table stored in the first storage means;

changing the interface address which has been set up in the first interface to the first interface address included in the read out addresses; and sending an address change message that the interface address which has been set up in the first interface is changed to the first interface address to the plural terminal units, and comprising the steps, by each of the terminal units, of:

receiving the address change message sent from the apparatus for connecting networks;

in response to reception of the address change message, changing an address of the terminal unit to the terminal unit address;

sending an address change confirmation message that the terminal unit address is changed to the apparatus for connecting networks;

in response to transmission of the address change message, receiving the terminal unit address transmission requirements which are sent from the terminal units; and in response to the received terminal unit address transmission requirements, sending the terminal unit addresses included in the addresses read out from the first table stored in the first storage means to the respective plural terminal units included in the first network, and comprising the steps, by the apparatus for connecting networks, of:

receiving the address change confirmation messages which are sent from the respective terminal units; and in response to reception of the address change confirmation messages sent from the plural terminal units, sending an address change end message that the entire terminal unit addresses of the plural terminal units are changed to the plural terminal units, and comprising the step, by each of the terminal units, of:

receiving the address change end message sent from the apparatus for connecting networks.

10. The method for connecting networks as set forth in claim 9, comprising the step, by each of the terminal units, of:

in response to reception of the address change message, sending a terminal unit address transmission requirement, wherein the terminal unit changes an address of the terminal unit to the terminal unit address sent from the apparatus for connecting networks.

11. The method for connecting networks as set forth in claim 9, comprising the step, by each of the terminal units, of:

storing a second table in which terminal unit addresses which can be set up in the terminal unit correspond to indexes, which are given to identify the plural respective addresses arranged in the first table stored in the first storage means of the apparatus for connecting networks, in a second storage means, wherein the apparatus for connecting networks adds indexes of the addresses, which include the changed first interface address, to the address change message, and sends the address change message to the plural terminal units, and wherein, in response to reception of the address change message, to which the indexes are added, the terminal unit refers to the second table stored in the second storage means to retrieve terminal unit addresses which correspond to the indexes added to the address change message, and changes an address of the terminal unit to thus retrieved terminal unit address.

* * * * *